(12) United States Patent
Lin et al.

(10) Patent No.: US 7,823,568 B1
(45) Date of Patent: Nov. 2, 2010

(54) EVAPORATIVE EMISSION CONTROL CANISTER FOR AUTOMOTIVE VEHICLE

(75) Inventors: Jhun Lin, Novi, MI (US); Robert D. Boyer, Livonia, MI (US); William Keith McDonald, Ypsilanti, MI (US); Calvin Young, Troy, MI (US)

(73) Assignee: Ford Global Technologies, Dearborn, MI (US)

( * ) Notice: Subject to any disclaimer, the term of this patent is extended or adjusted under 35 U.S.C. 154(b) by 12 days.

(21) Appl. No.: 12/432,995

(22) Filed: Apr. 30, 2009

(51) Int. Cl.
*F02M 33/02* (2006.01)

(52) U.S. Cl. .................... 123/518; 123/519; 96/147

(58) Field of Classification Search ............ 123/516, 123/518, 519, 520, 198 E; 96/147
See application file for complete search history.

(56) References Cited

U.S. PATENT DOCUMENTS

| | | | | |
|---|---|---|---|---|
| 4,411,441 | A * | 10/1983 | Marcheix et al. | 280/834 |
| 4,550,923 | A * | 11/1985 | Ogawa et al. | 280/834 |
| 4,727,955 | A * | 3/1988 | Honda et al. | 180/296 |
| 4,793,839 | A * | 12/1988 | Hayashida et al. | 96/130 |
| 4,805,581 | A * | 2/1989 | Yamada et al. | 123/519 |
| 5,089,938 | A * | 2/1992 | White et al. | 361/825 |
| 5,386,811 | A * | 2/1995 | Rochette | 123/519 |
| 5,702,125 | A * | 12/1997 | Nakajima et al. | 280/834 |
| 6,227,782 | B1 | 5/2001 | Bowling et al. | |
| 6,395,072 | B2 * | 5/2002 | Miura et al. | 96/133 |
| 6,514,326 | B1 * | 2/2003 | Hara et al. | 96/133 |
| 6,730,262 | B1 | 5/2004 | Hendry et al. | |
| 6,843,543 | B2 | 1/2005 | Ramesh | |
| 6,893,047 | B2 * | 5/2005 | Chou et al. | 280/834 |
| 6,939,504 | B2 | 9/2005 | Homann et al. | |
| 7,235,744 | B2 | 6/2007 | Zoller | |
| 7,354,286 | B1 | 4/2008 | Lee | |
| 7,364,009 | B2 | 4/2008 | Sperle et al. | |
| 7,370,985 | B2 | 5/2008 | Boddy et al. | |
| 2010/0032989 | A1 * | 2/2010 | Ohara | 296/204 |

FOREIGN PATENT DOCUMENTS

EP 1116831 A1 7/2001

* cited by examiner

*Primary Examiner*—Thomas N Moulis
(74) *Attorney, Agent, or Firm*—Jerome R. Drouillard; David B. Kelley

(57) ABSTRACT

An evaporative emission control canister for an automotive vehicle includes a canister body and a bracket for attaching the body to a structural member of a vehicle. A number of fastener sets attach the bracket to the canister body, with each of the fastener sets including a closed-end hollow core boss having a generally cylindrical wall of uniform thickness and a number of buttresses applied to an outer surface of the generally cylindrical wall. The buttresses have the same uniform thickness as the generally cylindrical wall and are molded along with the cylindrical wall as one piece with an inner portion of the canister body.

15 Claims, 3 Drawing Sheets

EVAPORATIVE EMISSION CONTROL CANISTER FOR AUTOMOTIVE VEHICLE

BACKGROUND OF THE INVENTION

1. Field of the Invention

The present invention relates to a carbon canister for capturing evaporative emissions from the fuel system of an automotive vehicle.

2. Related Art

Evaporative emission control requirements relating to automotive vehicles, although in place for many years, have become increasingly more stringent. Typically, vapors from a fuel system are adsorbed upon carbon pellets within a canister and then later desorbed, while the engine is running, by pulling fresh air over the carbon pellets. Proper mounting of carbon canisters is important to their continued performance and longevity. Acceptable performance demands that the mounting not cause any ruptures or anomalies in the canister's wall, which could allow hydrocarbons to escape the canister. Moreover, the canister must be mounted carefully to avoid breakdown of the pellets due to excessive vibration. This, in turn, demands that the canister be firmly mounted to a substantial structure in the vehicle, and not be allowed to move unrestrained in response to vehicle road load inputs.

Although it is known to mount carbon evaporative emission control canisters with screws extending through the wall of the canister, known systems utilize canister mounting structures with inconsistent section thicknesses giving rise to voids, potential leaks, and an absence of mechanical robustness and integrity for engagement of fasteners with the canister.

It would be desirable to provide an evaporative emission control canister having a fastening system which is both leak-proof and which provides secure mounting for threaded fasteners to allow the canister to be mounted to a vehicle without an unacceptable risk of damage due to high frequency vibration.

SUMMARY OF THE INVENTION

According to an aspect of the present invention, an evaporative emission control canister for an automotive vehicle includes a canister body and a bracket for attaching the canister body to a structural member. A number of fastener sets is provided for attaching the bracket to the canister body. Each of the fastener sets includes a closed-end, generally cylindrical boss having uniform wall thickness and a number of external buttresses, with the boss and buttresses being molded to an inner surface of the canister body. A threaded fastener extends through the bracket and into substantially the entire length of the cylindrical boss.

According to another aspect of the present invention, generally cylindrical bosses and external buttresses which constitute part of the fastener set for a carbon canister are molded as one piece upon an inner surface of a canister body.

According to another aspect of the present invention, threaded fasteners used to mount an evaporative emissions control canister extend into molded, generally cylindrical bosses along axially directed inner cylindrical bores configured during molding of the canister body with a removable core pin having a generally cylindrical shank with an external thread formed at a first end, for the purpose of anchoring the core pin to a mold, and an external drive feature formed at the second end.

It is an advantage of an evaporative emission control canister according to the present invention that the canister body utilizes a hollow core cylindrical boss and buttress system having uniform wall thickness, which allows the bosses to be molded with a consistent internal bore and consistent wall thickness, so as to promote excellent retention of mounting screws within the bosses, while avoiding fuel vapor leaks from the canister.

It is another advantage of an evaporative emission control canister according to the present invention that mounting bosses are molded with the aid of a core pin having an external drive feature located at an end of the core pin, which eliminates the need for the core pin to have a larger diameter at its threaded shank end, which would, in turn, impair the screw retention capability of the molded boss.

It is yet another advantage of an evaporative emission control canister according to the present invention that the carbon absorber pellets contained within the canister will be protected from damage due to high frequency vibration.

Other advantages, as well as features of the present invention will become apparent to the reader of this specification.

DETAILED DESCRIPTION OF THE PREFERRED EMBODIMENT

Figure 1:
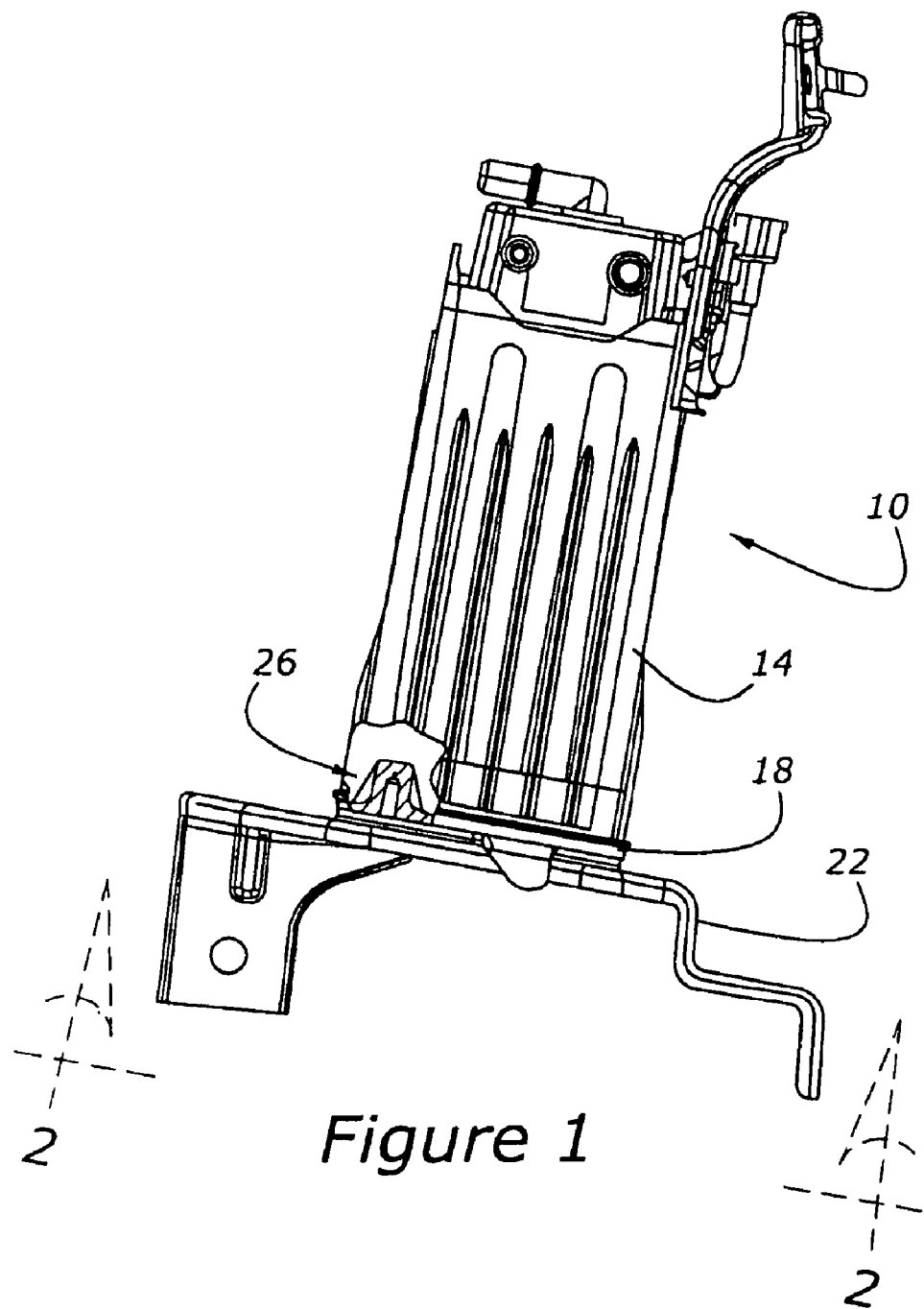
FIG. 1 is a partially cut-away plan view of an evaporative emission control canister according to an aspect of the present invention.

As shown in FIG. 1, an evaporative emission control canister assembly, 10, has a body, 14, to which a bracket, 22, has been mounted for the purpose of attaching canister body 14 to a structural member (not shown) of an automotive vehicle. FIG. 1 also shows a boss, 26, which is a closed-end generally cylindrical boss, and which is shown in greater detail in FIG. 4, as part of a mounting system for bracket 22.

Figure 2:
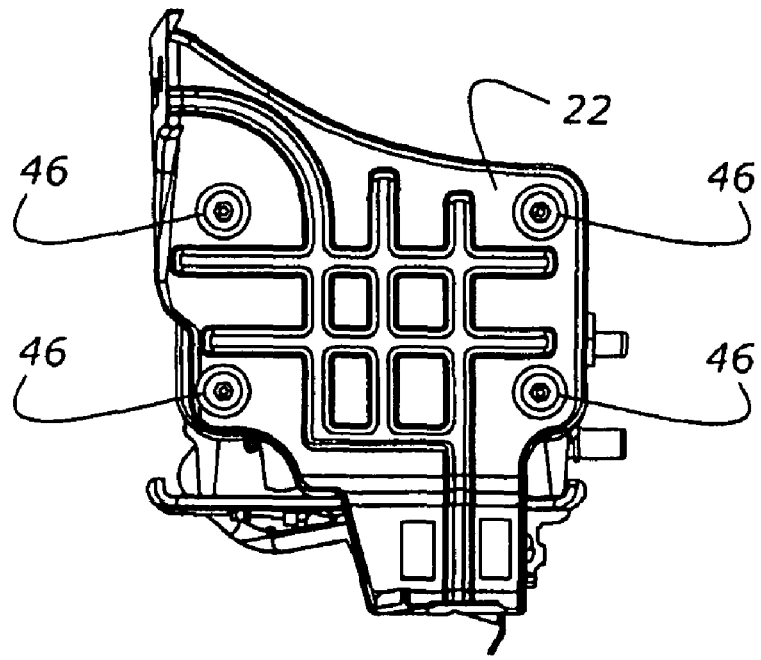
FIG. 2 is an elevation of the lower portion of the evaporative emission control canister of FIG. 1, taken along the line 2-2 of FIG. 1.
Figure 3:
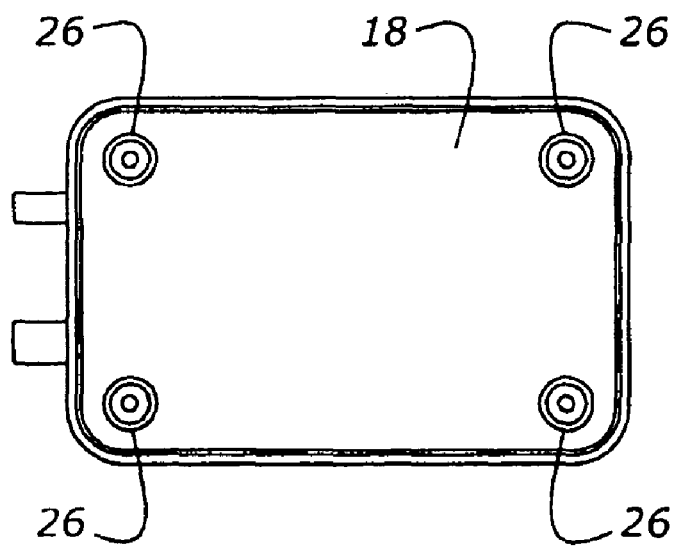
FIG. 3 is a plan view of the cover portion of the body of the carbon canister shown in FIGS. 1 and 2, showing with particularity the locations of closed-end generally cylindrical bosses used to mount a bracket to the body of canister assembly.

FIG. 2 illustrates that bracket 22 is mounted to canister body 14 with four self-tapping screws, 46. Each of these screws is mounted within one of the bosses shown in FIGS. 1 and 4.

Figure 4:
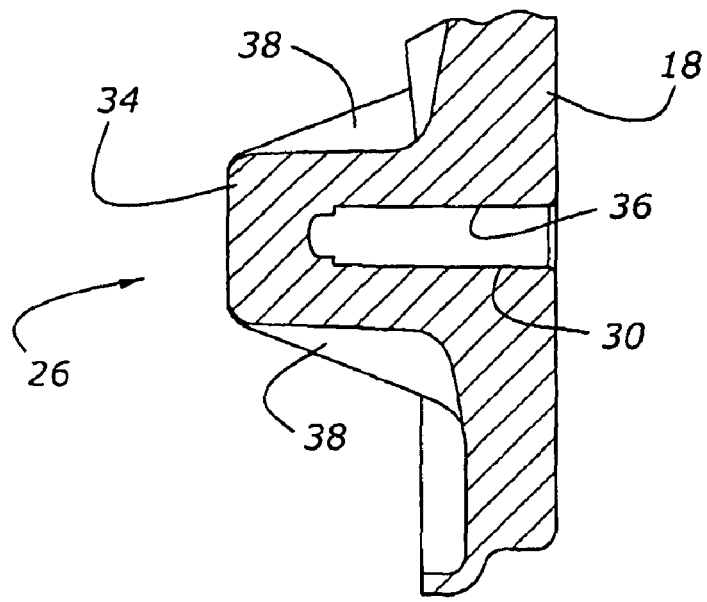
FIG. 4 is a sectional view showing a canister cover and a cylindrical boss according to an aspect of the present invention.
Figure 5:
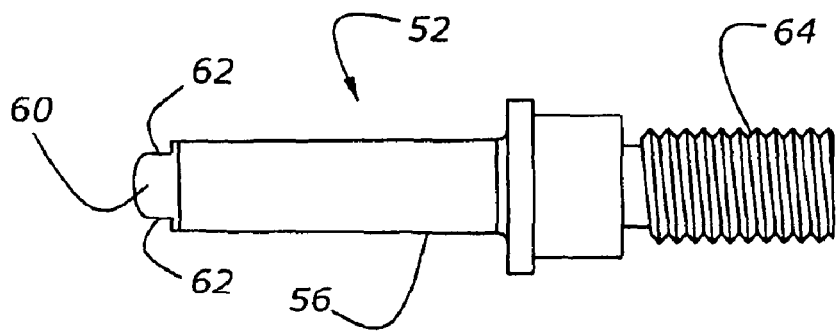
FIG. 5 illustrates a core pin used in part for molding a boss according to an aspect of the present invention.

FIG. 4 shows that closed-end, generally cylindrical boss 26 has a generally cylindrical wall, 30, which is molded to an inner portion of canister cover 18. In turn, canister cover 18 is welded to the remainder of canister body 14. Generally cylindrical wall 30 is supported by a number of buttresses or ribs, 38. Ribs 38 and generally cylindrical wall 30 have a common wall thickness. This assures that the molding process will occur smoothly without voids or holes which could impair the operational effectiveness of emission control canister 10 by allowing hydrocarbons to escape from the canister. FIG. 4 also shows a distinctive shape of hollow inner core 36 of generally cylindrical boss 26. Hollow inner core 36 is shaped according to the configuration of a removable core pin, 52, which is shown in FIG. 5.

Figure 6:
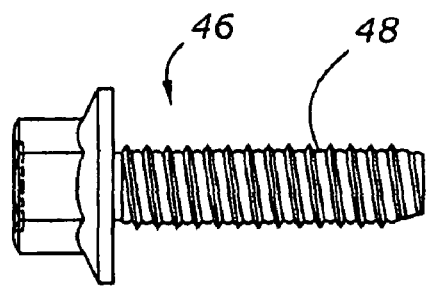
FIG. 6 illustrates a self-tapping screw suitable for use with an evaporative control canister according to an aspect of the present invention.

Removable core pin 52 has a cylindrical shank, 56, with an external thread, 64, formed on a first end, and an external hex drive feature, 60, formed on the opposite end. External drive 60, which is illustrated as having two parallel wrench flats, allows core pin 52 to be turned with a wrench and extracted from a molding apparatus without the need for an increased diameter section, such as would be the case were a hexagonal drive nut to be provided at the intersection between threaded end 64 and the smooth part of shank 56. This means that the hollow inner core 36 of boss 26 has a constant diameter at its base. This promotes greater retention integrity for threaded fasteners 46, one of which is shown in FIG. 6 as having a multiple of self-tapping threads, 48.

The present invention is particularly useful when canister assembly 10 is formed from plastic material such as glass filled nylon and other plastics known to those skilled in the art and suggested by this disclosure, because this invention allows an evaporative emissions canister to be mounted securely, and without leakage issues. In turn, what is important here is that with the generally cylindrical fastener bosses and external buttresses molded as one piece upon an inner surface of the cover wall or other wall of canister body 14, the molding process has the capability to yield a consistent wall thickness for the bosses and buttresses, which promotes both fastener retention and hydrocarbon tightness of the completed evaporative emission control canister.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. An evaporative emission control canister for an automotive vehicle, comprising:
   a canister body;
   a bracket for attaching the canister body to a structural member; and
   a plurality of fastener sets for attaching said bracket to said canister body, with said fastener sets comprising:
   a closed-end, generally cylindrical boss having a uniform wall thickness and a plurality of external buttresses, with said boss being molded to an inner surface of said canister body; and
   a threaded fastener extending through said bracket and into substantially the entire length of said cylindrical boss.

2. An evaporative emission control canister according to claim 1, wherein said generally cylindrical bosses and external buttresses are molded as one piece upon an inner surface of a cover wall of said canister body.

3. An evaporative emission control canister according to claim 1, wherein said threaded fastener comprises a self-tapping screw.

4. An evaporative emission control canister according to claim 1, wherein said threaded fastener extends into said boss along an axially directed, inner cylindrical bore configured during molding of the canister body with a removable core pin having a generally cylindrical shank with an external thread formed at a first end and an external drive feature formed at a second end.

5. An evaporative emission control canister according to claim 1, wherein said canister body is molded from a plastic material.

6. An evaporative emission control canister for an automotive vehicle, comprising:
   a canister body molded from a plastic material;
   a bracket for attaching the canister body to a structural member of an automotive vehicle; and
   a plurality of fastener sets for attaching said bracket to said canister body, with each of said fastener sets comprising:
   a closed-end, hollow core boss having a generally cylindrical wall of uniform thickness and a plurality of buttresses applied to an outer surface of said generally cylindrical wall, and with said generally cylindrical wall and said buttresses being molded as one piece with an inner portion of said canister body; and
   a screw extending through said bracket and into contact with a bore extending along the length of said boss.

7. An evaporative emission control canister according to claim 6, wherein said generally cylindrical walls and buttresses are molded to a cover portion which is joined to said canister body.

8. An evaporative emission control canister according to claim 6, wherein said generally cylindrical walls and buttresses have common, uniform wall thickness.

9. An evaporative emission control canister according to claim 6, further comprising a hydrocarbon adsorber housed within said canister body.

10. An evaporative emission control canister according to claim 6, wherein said canister body is molded from glass-filled nylon.

11. An evaporative emission control canister according to claim 6, wherein said screw comprises a self-tapping screw.

12. An evaporative emission control canister for an automotive vehicle, comprising:
   a canister body molded from a plastic material;
   a bracket for attaching the canister body to a structural member of an automotive vehicle; and
   a plurality of fastener sets for attaching said bracket to said canister body, with each of said fastener sets comprising:
   a closed-end, hollow core, generally cylindrical boss having a plurality of buttresses applied to an outer cylindrical surface of said boss, with said boss and said buttresses being molded as one piece with an inner portion of said canister body, and with said generally cylindrical boss and said buttresses having a common wall thickness; and
   a screw extending through said bracket and into thread contact with said generally cylindrical boss.

13. An evaporative emission control canister according to claim 12, wherein said screw is in thread contact with substantially the entire length of said cylindrical boss.

14. An evaporative emission control canister for an automotive vehicle, comprising:
   a canister body molded from a plastic material; and
   a plurality of fastener sets for attaching said canister body to a supporting structure incorporated in an automotive vehicle, with each of said fastener sets comprising:
   a closed-end, hollow core, generally cylindrical boss having a plurality of buttresses applied to an outer cylindrical surface of said boss, with said boss and said buttresses being molded as one piece with an inner portion of said canister body, and with said generally cylindrical boss and said buttresses having a common wall thickness; and
   a fastener extending into said cylindrical boss.

15. An evaporative emission control canister according to claim 14, wherein said fastener comprises a threaded screw which engages the substantially the entire length of said generally cylindrical boss.

* * * * *